United States Patent
Ishihara

(10) Patent No.: US 7,193,449 B2
(45) Date of Patent: Mar. 20, 2007

(54) METHOD AND APPARATUS FOR GENERATING MULTI-PHASE SIGNAL

(75) Inventor: Kenichi Ishihara, Kanagawa-ken (JP)

(73) Assignee: Leader Electronics Corp., Yokohama (JP)

( * ) Notice: Subject to any disclaimer, the term of this patent is extended or adjusted under 35 U.S.C. 154(b) by 19 days.

(21) Appl. No.: 10/972,397

(22) Filed: Oct. 26, 2004

(65) Prior Publication Data

US 2005/0094481 A1    May 5, 2005

(30) Foreign Application Priority Data

Oct. 31, 2003    (JP)    ............................. 2003-371974

(51) Int. Cl.
*H03B 21/00*    (2006.01)
(52) U.S. Cl. ...................... 327/106; 327/105; 708/272
(58) Field of Classification Search ................ 327/258, 327/291, 295–297, 105, 106, 113; 708/272
See application file for complete search history.

(56) References Cited

U.S. PATENT DOCUMENTS

| | | | | |
|---|---|---|---|---|
| 4,908,842 | A * | 3/1990 | Collins ........................ | 375/373 |
| 4,956,798 | A * | 9/1990 | Dinteman .................... | 708/273 |
| 5,258,937 | A * | 11/1993 | Blackmon ................... | 708/272 |
| 5,563,535 | A * | 10/1996 | Corry et al. ................. | 327/105 |
| 5,802,112 | A * | 9/1998 | Ganter ........................ | 375/260 |
| 5,898,325 | A * | 4/1999 | Crook et al. ................ | 327/105 |
| 5,954,787 | A * | 9/1999 | Eun ............................ | 708/276 |
| 6,320,431 | B1 * | 11/2001 | Potson et al. ................ | 327/106 |
| 6,429,796 | B1 * | 8/2002 | Buckley ...................... | 341/120 |
| 6,890,046 | B1 * | 5/2005 | Fukano et al. ................ | 347/10 |
| 6,922,297 | B2 * | 7/2005 | Kirby .......................... | 360/29 |
| 6,957,239 | B2 * | 10/2005 | Conway et al. ............. | 708/272 |

FOREIGN PATENT DOCUMENTS

JP    06-140950    5/1994

OTHER PUBLICATIONS

K. Hirade et al., "Fading Simulator For Land Mobile Radio Communication," Yokosuka Electrical Communication Laboratory, NTT, vol. 58-B, No. 9, Sep. 1975, pp. 449-456 and partial translation, 8 pages.

* cited by examiner

*Primary Examiner*—Timothy P. Callahan
*Assistant Examiner*—Hai L. Nguyen
(74) *Attorney, Agent, or Firm*—Fish & Richardson P.C.

(57) ABSTRACT

A multi-phase signal generating apparatus is provided for readily generating multiple phase signals. The multi-phase signal generating apparatus comprises a signal data storage which stores a plurality of data segments for determining a predetermined period of one signal. A data segment selector circuit selects segments for constituting the phase signals from a plurality of data segments stored in the signal data storage for determining the predetermined period of a signal in each of a plurality of segment intervals which make up a phase signal cycle for generating a phase signal. Each phase signal generator circuit forms each phase signal using a plurality of selected segments for each phase signal during a plurality of segment intervals.

21 Claims, 12 Drawing Sheets

METHOD AND APPARATUS FOR GENERATING MULTI-PHASE SIGNAL

BACKGROUND OF THE INVENTION

The present invention relates generally to the field of signal generation, and more particularly, to a method and apparatus for generating a multi-phase signal.

In radio communications including mobile communications and ground digital television broadcasting, radiowaves are received at lower intensities behind buildings, and multipath reception is caused by radiowaves reflected by buildings. This phenomenon is called "multipath fading", and gives rise to a degraded quality of reception. In this connection, a multipath fading simulator is used for artificially generating multipath fading in order to evaluate a mobile communication device. The simulator individually generates multi-phase Gaussian noise data having different phases on a phase-by-phase basis for each transmission path (sometimes called the apathy), and applies each phase of these multi-phase noise data to the input signal on a path-by-path basis in order to provide a multipath fading effect for an input signal (see, for example, Japanese Patent Application Public-Disclosure No. 06-140950).

SUMMARY OF THE INVENTION

According to one aspect of the present invention, a method is provided for generating a plurality of phase signals having different phases. The method includes the steps of: in each of a plurality of segment intervals constituting a phase signal cycle for generating said phase signals, selecting from a plurality of data segments defining a predetermined period of a single signal stored in a memory, a segment for constituting each of said phase signals and delivering the selected segment; and generating each of said phase signals using a plurality of said selected segments for each of said phase signals during said plurality of segment intervals.

In another aspect of the present invention, an is provided for generating a plurality of phase signals having different phases. The apparatus includes a memory that stores a plurality of data segments for defining a predetermined period of a single signal; a selector circuit that in each of a plurality of segment intervals constituting a phase signal cycle for generating said phase signals, selects from a plurality of data segments defining a predetermined period of a single signal stored in said memory a segment for constituting each of said phase signals, and delivers the selected segment; and a generator circuit that generates each of said phase signals using a plurality of said selected segments for each of said phase signals during said plurality of segment intervals.

According to a further aspect of the present invention, said selected segment constituting each of said phase signal in each of said segment intervals may be selected depending on a phase difference between said plurality of phase signals.

Also, according to a further aspect of the present invention, each of said segment intervals may include a plurality of segment subintervals corresponding to said plurality of phase signals, respectively, wherein said selecting a segment may include, for each of said phase signals, reading said selected segment from said memory during said segment subinterval corresponding to each of said phase signal in each of said segment intervals.

Further, according to another aspect of the present invention, the reading may include defining a plurality of sequences of memory addresses for said plurality of phase signals; and accessing said memory during said segment subintervals of said plurality of segment intervals using said sequence of memory addresses corresponding to each of said phase signals. In this case, said plurality of sequences of memory addresses may be shifted one after another by a predetermined amount corresponding to the phase difference between said plurality of phase signals.

Further, according to a further aspect of the present invention, the generating of each of said phase signals may include acquiring and holding each of said selected segments for said plurality of phase signals from said memory; and simultaneously outputting each of said selected segments for said plurality of phase signals at the end of each of said segment intervals. In this case, the generating of each of said phase signals may further include interpolating said selected segments for each of said phase signals. The interpolation may use an interpolation coefficient, and said interpolation coefficient may be determined depending on the difference between adjacent ones of said data segments and the number of said plurality of phase signals. Also, each of said segment intervals may be shorter than one cycle of each of said phase signals, and said interpolation may be performed at a shorter interpolation cycle than said segment interval.

Furthermore, according to a further aspect of the present invention, the selected segments may be read from the memory at a reading rate which varies depending on the frequency of each of the phase signals to be generated. The frequency of the phase signal may be varied in accordance with the Doppler frequency.

Also, according to another aspect of the present invention, the plurality of phase signals may comprise a multi-phase Gaussian noise signal. In addition, the multi-phase Gaussian noise signal may be used for applying a multipath fading effect.

According to the present invention, since a multi-phase signal, i.e., a plurality of phase signals, can be generated from data of at least one period of a signal, a memory required therefor can be minimized. Further, the multi-phase signal generating apparatus can permit the user to arbitrarily set the phase difference between respective ones of the plurality of phase signals, which constitute a multi-phase signal. Further, with the use of an interpolator, signals can be reproduced with a higher accuracy. In addition, the frequency of the multi-phase signal can be readily changed in accordance with the Doppler frequency, which may be required in the multipath fading.

These and other objects and advantages of the present invention will become more apparent from the following description of the illustrative embodiments.

BRIEF DESCRIPTION OF THE DRAWINGS

FIG. 4 shows a simplified example for outlining the operation of the static Gaussian process generator in. FIG. 2;

DETAILED DESCRIPTION OF THE EMBODIMENTS

In the following, the present invention will be described in connection with several embodiments thereof with reference to the accompanying drawings. The disclosure of Japanese Patent application No. 2003-371974 filed Oct. 31, 2003 entitled "Method and apparatus for generating multi-phase signal" and including specification, drawings and claims is incorporated herein by reference in its entirety.

Figure 1:
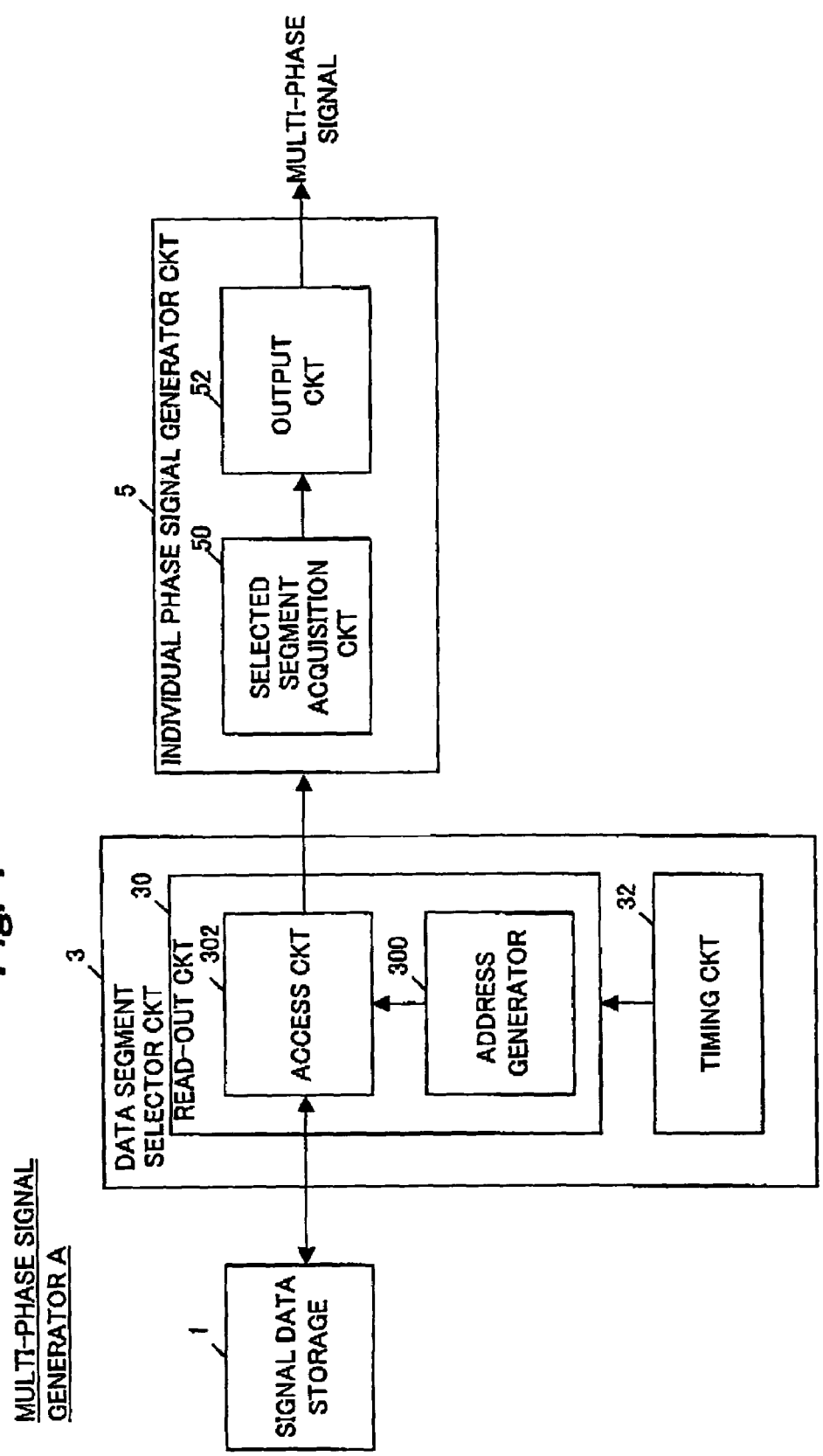
FIG. 1 is a block diagram illustrating a multi-phase signal generator according to one embodiment of the present invention.

FIG. 1 illustrates in block diagram form a multi-phase signal generator A according to one embodiment of the present invention. As illustrated, the multi-phase signal generator A generally comprises a signal data storage 1, a data segment selector circuit 3, and an individual phase signal generator circuit 5. The signal data storage 1 stores signal data comprised of data segments for certain periods, including at least one period of a signal which is relied on to generate a multi-phase signal. The data segment selector circuit 3 selects a data segment required for forming each of a plurality of phase signals, and supplies the selected data segment to the individual phase signal generator circuit 5. Upon receipt of the data segment, the individual phase signal generator circuit 5 forms respective phase signals from the supplied data segments to provide a plurality of phase-signals.

In one embodiment, the data segment selector circuit 3 comprises a read-out circuit 30 and a timing circuit 32. The read-out circuit 30 comprises an address generator 300 and an access circuit 302. The timing circuit 32 determines an operation timing for the multi-phase signal generator A by forming and generating a variety of timing signals for the read-out circuit 30. In one example, the timing circuit 32 determines a plurality of segment intervals IS which comprise a phase signal cycle CS for generating each phase signal. In each segment interval, the timing circuit 32 selects a data segment required to form each phase signal. The timing circuit 32 also forms and generates a timing signal which defines segment subintervals SUBI that make up each segment interval. In each segment subinterval SUBI, the data segment required to form each of a plurality of phase signals in each segment interval is selected. The address generator circuit 300 generates an address for reading a data segment required to form each phase signal from the storage 1 under the control of the foregoing timing signals. This is performed, for example, by generating a sequence of memory addresses for each of the plurality of phase signals. The access circuit 302 accesses the storage 1 in accordance with the sequence of memory addresses received from the address generator circuit 300, to read data segments sequentially for a plurality of different phase signals and sequentially in a time direction of each phase signal, and supplies the read data segments to the individual phase signal generator circuit 5 as selected data segments.

The individual phase signal generator circuit 5, which receives the selected data segments, comprises a selected segment acquisition circuit 50 and an output circuit 52. The acquisition circuit 50 acquires an appropriate selected data segment for forming a particular phase signal because the selected data segments delivered from the access circuit 302 mixedly includes data segments associated with a plurality of different phase signals. The subsequent output circuit 52 outputs a selected segment acquired for a particular phase signal, such that a plurality of phase signal data having the phases shifted one after another are formed from one piece of signal data stored in the signal data storage 1. Also, according to one embodiment of the present invention, the output circuit 52 may comprise an interpolator to smooth the waveform of a signal formed by each phase signal data.

Figure 2:
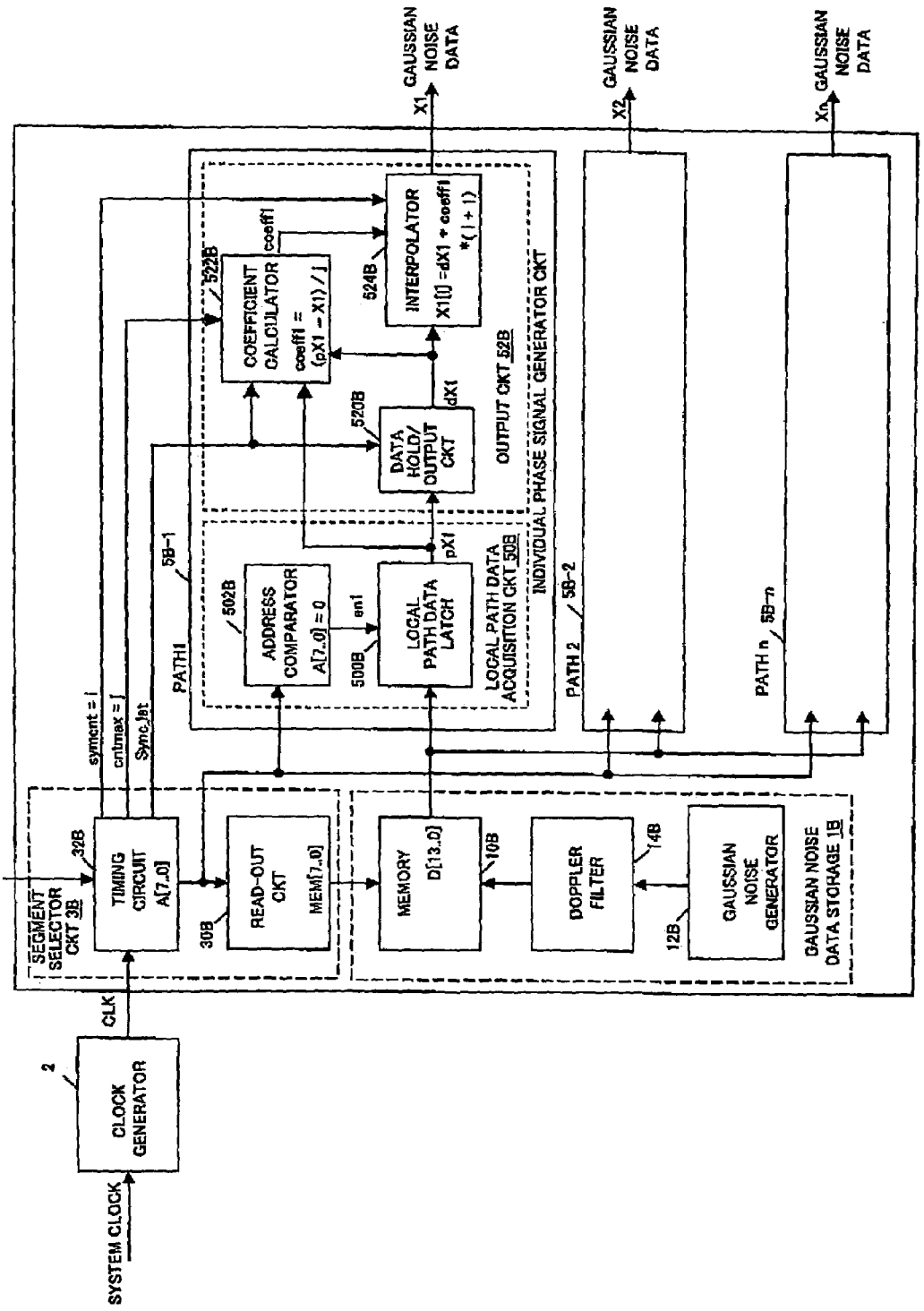
FIG. 2 is a block diagram illustrating a static Gaussian process generator which includes the multi-phase signal generator of FIG. 1 applied to the generation of multi-phase Gaussian noise data in accordance with one embodiment of the present invention.

Next, FIG. 2 illustrates in block diagram form a static Gaussian process generator B according to one embodiment, which applies the multi-phase signal generator A in FIG. 1 to the generation of multi-phase Gaussian noise data for use in a multipath fading simulator. Elements in FIG. 2 corresponding to those in FIG. 1 are designated the same reference numerals with a letter "B" suffixed thereto. The static Gaussian process generator B generates a plurality n of Gaussian noise data which have different phases from one another. As illustrated, the static Gaussian process generator B comprises a signal data storage 1B, a segment selector circuit 3B, and n individual phase signal generators (also called the "path") 5B-1–5B-n. The static Gaussian process generator B also comprises a clock generator 2 for managing the operation of the overall generator B. In the following, the general configuration and operation of the static Gaussian process generator B will be described with reference to FIGS. 3 and 4, followed by description on the configuration and operation in greater detail with reference to FIGS. 5 to 11.

First, as Illustrated in FIG. 2, the signal data storage 1B included in the generator B comprises a memory 10B, as well as a Gaussian noise data generator 12B and a Doppler filter 14B for writing Gaussian noise data into the memory 10B. The memory 10B can be a writable random access memory, and data need to be written into the memory 10B each time the static Gaussian process generators B or a system including the same is started. The Gaussian noise data generator 12B, which generates Gaussian noise data that form part of a static Gaussian noise process, can be implemented by a variety of known configurations. For example, a Gaussian noise generator based on M-series is known. The subsequent Doppler filter 14B filters Gaussian noise data from the generator 12B before it is stored in the memory 10B. The Doppler filter 14B has a filter coefficient which is calculated on the basis of the Doppler frequency determined by a moving speed of a mobile unit and an RF frequency in mobile communications. The Doppler filter 14B can also be implemented by a variety of known configurations. For example, it is known that the amplitude of a signal applied with a multipath fading phenomenon can be modeled by a probability process having a Rayleigh distribution. When the Doppler frequency need not be varied, the signal data storage 1B may comprise only ROM which stores Gaussian noise data that have been previously passed through a Doppler filter.

Figure 3:
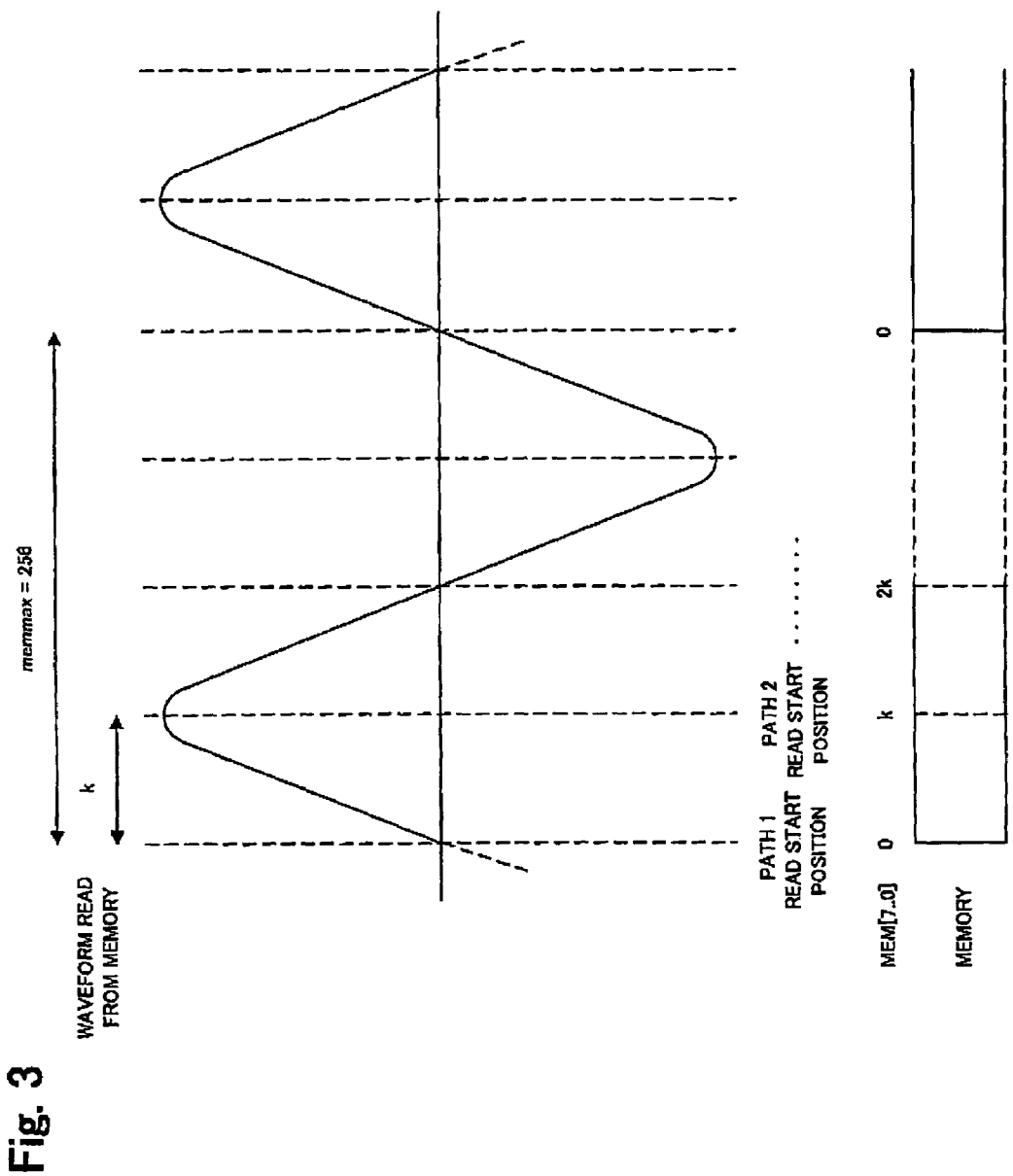
FIG. 3 shows the relationship between addresses of a memory in FIG. 2 and waveform data stored therein (where a sinusoidal waveform is illustrated for simplicity)

FIG. 3 shows the relationship between addresses in the memory 10B and waveform data stored therein. For simplifying the illustration, FIG. 3 illustrates a sinusoidal wave instead of Gaussian noise data. As shown, the memory 10B stores one period of waveform data segments in an address space defined by 8-bit memory addresses MEM[7 . . . 0], i.e., from address 0 to address 255. FIG. 3 also shows the relationship between the first read-out address location and waveform of each path, later described, and the memory address space. Respective paths generate phase signals having the phases shifted one after another by shifting the first read-out address by k.

Next, the segment selector circuit 3B included in the static Gaussian process generator B comprises a read-out circuit 30B and a timing circuit 32B, as illustrated. First, the timing circuit 32B receives a clock CLK generated by the clock generator 2 in response to a system clock to generate a variety of timing signals and constants, specifically, a maximum count value cntmax (=j) during a segment interval; a system count value symcnt (=i) during a segment interval; and a synchronous latch signal (Sync_lat) generated at segment intervals; and a path address signal A[7 . . . 0]. Details of these signals will be described later.

Figure 4:
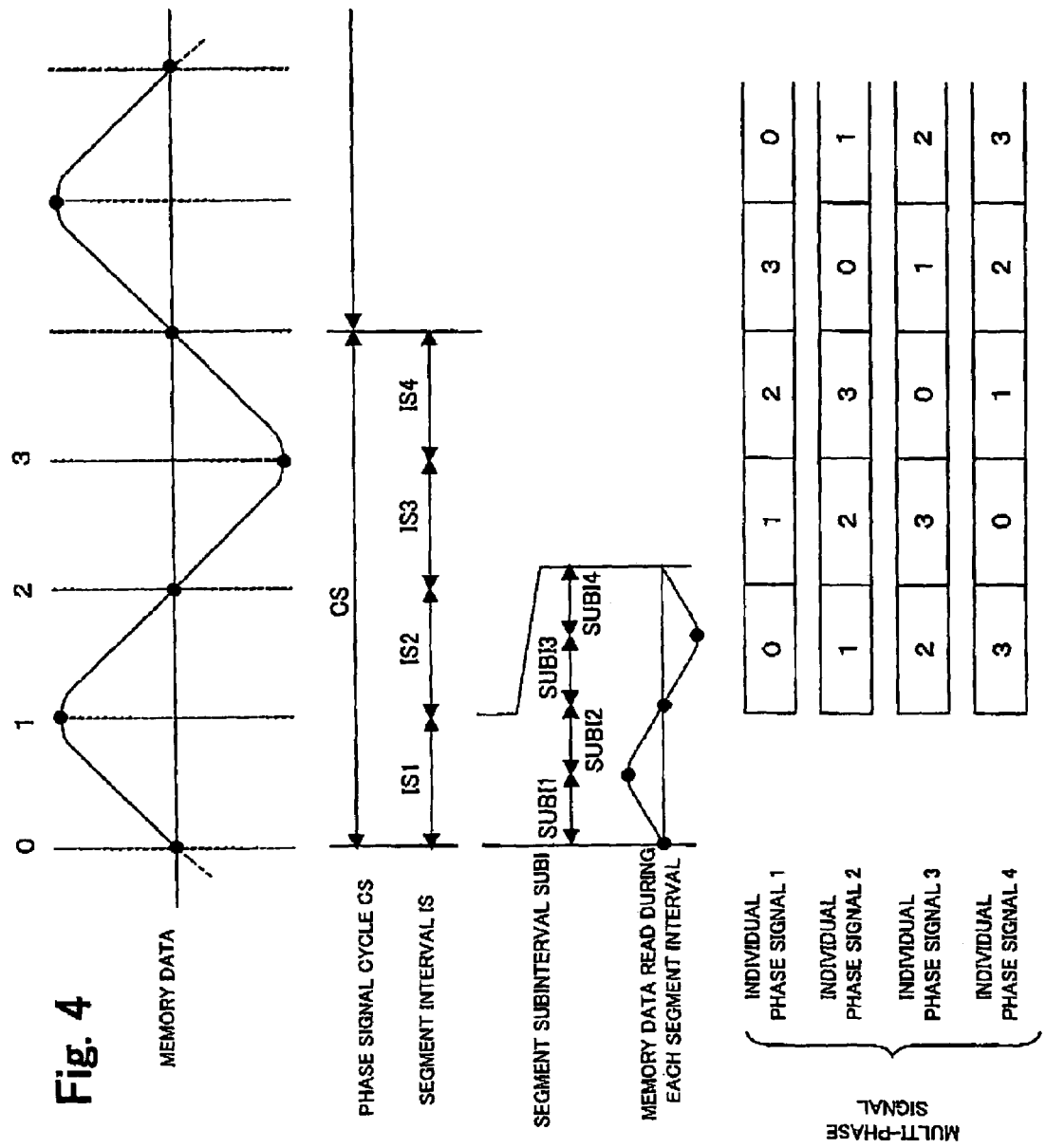

In the following, the static Gaussian process generator B will be described with reference to a simplified example illustrated in FIG. 4. For ease of understanding in FIG. 4, one period of a phase signal is made up of four data segments 0–3, and four phase signals 1–4 are generated with the phases shifted one after another by 90 degrees. In the present invention, one cycle CS of the phase signal is divided into a plurality of segment intervals IS which are equal in number to data segments required to make up one period of a phase signal. In the example illustrated in FIG. 4, there are four data segments 0–3, so that a phase signal cycle is divided into four segment intervals IS1–IS4. Also, each segment interval IS is divided into segment subintervals, the number of which is equal to a total number of a plurality of phase signals to be generated. In the example illustrated in FIG. 4, since there are four phase signals 1–4 in total, each segment interval is divided into four segment subintervals SUBI1–SUBI4.

The maximum count cntmax (=j) defines the length of an individual segment interval. In the example illustrated in FIG. 4, this is equal to the length of four segment subintervals because a total (n) of four phase signals should be generated. Alternatively, the length of each segment interval may be set to a period longer than a period of at least n segment subintervals which should be included therein. Next, the path address signal A[7 . . . 0] defines the period and a number of each of segment subintervals included in each segment interval, and also defines a timing at which each path, later described, obtains a selected segment. In the example illustrated in FIG. 4, the path address signal A[7 . . . 0] defines 0–3, i.e., subintervals SUB1–SUB4 for generating four phase signals. A selected segment for a phase signal 1 is acquired during SUB1, a selected segment for a phase signal 2 is acquired during SUB2, and so forth. The system count value symcnt (=i) indicates a number given to an interpolation cycle in interpolation processing which is executed in each of the segment intervals (IS1–SI4 in FIG. 4). The synchronous latch signal (Sync_lat) in turn serves as a timing signal for simultaneously outputting selected segments for a plurality of phase signals in synchronization for a plurality of paths at the end of each segment interval. In the example illustrated in FIG. 4, four selected segments are output imultaneously.

The read-out circuit 30B, which received the path address signal A[7 . . . 0], supplies memory addresses MEM[7. . . 0] to the memory 10B to read a 14-bit data segment D[13 . . . 0] for a plurality of phase signals. As can be appreciated from the example illustrated in FIG. 4, memory data 0–3 are read out in order during each segment interval.

Figure 6:
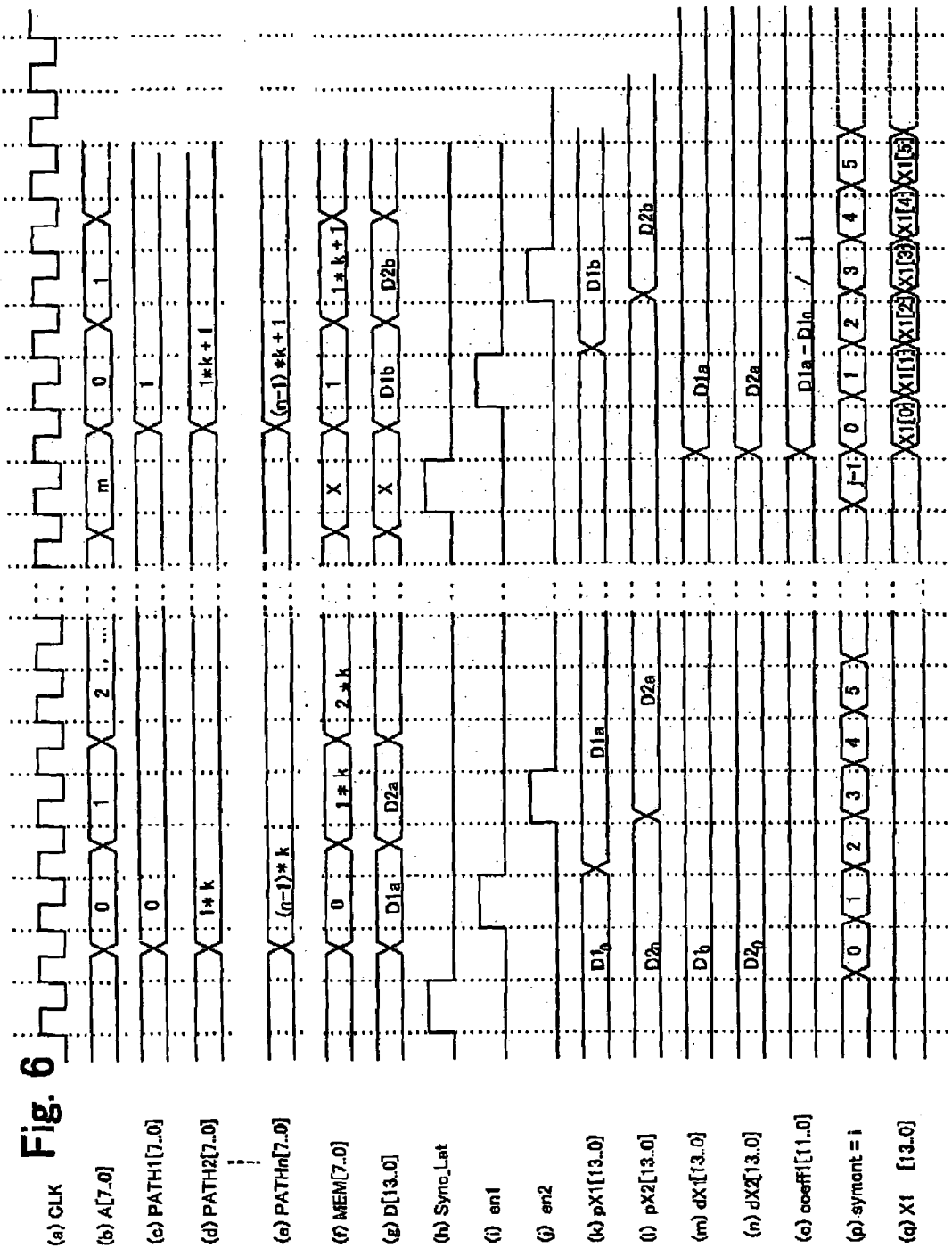
FIG. 6 is a timing chart representing in detail the operation of various circuit components of the static Gaussian process generator in FIG. 2.

Each of phase signal generator circuits, i.e., the paths which receive the read data segments, comprises a local data acquisition circuit 50B and an output circuit 52B. Since a plurality of paths 1–n are substantially identical in the circuit configuration, the following description will be mainly centered on the circuit of the path 1. The local path data acquisition circuit 50B of the path 1 comprises a local path data latch circuit 500B and an address comparator 502B. The address comparator 502B has a path address "0" for the path 1: "1" for the path 2: and "n−1" for the path n. Thus, the address comparator 502B of the path 1 makes a comparison to see whether the path address signal A[7 . . . 0] is equal to zero, and generates an enable signal en1 only when the path address signal A[7 . . . 0] is equal to zero, thus indicating the period of the segment subinterval assigned to the path itself (see. FIG. 6(*i*)). It should be noted that an enable signal en2 shows an example of a similar signal generated by the address comparator in the path 2. At the time of receiving the enable signal en1, the local path data latch circuit 500B latches a data segment from the memory 10B as local path data. In the example illustrated in FIG. 4, when the path address signal A is equal to zero (A=0), this indicates the segment subinterval SUBI1, in which case a segment "0" of memory data is latched for a phase signal 1. When the path address signal A is equal to one (A=1), this indicates the segment subinterval SUBI2, in which case a segment 1 of the memory data is latched for a phase signal 2. The output data of the local path data latch circuit 500B indicates segment data pX1.

The subsequent output circuit 52B comprises a data hold/output circuit 520B, an interpolation coefficient calculator circuit 522B, and an interpolator circuit 524B. More specifically, the data hold/output circuit 520B holds a latched selected segment from the local path data latch circuit 500B for a period of the same segment interval as that in which the selected segment is obtained, and outputs the selected segment as segment data dX1 at the end of the segment interval in response to the synchronous latch signal (Sync_lat). In the example illustrated in FIG. 4, at the end of the interval IS1, data "0" selected for the phase signal 1 during the subinterval SUBI1, data "1" selected for the phase signal 2 selected during the subinterval SUBI2, data "2" selected for the phase signal 3 selected during the subinterval SUBI3, and data "3" selected for the phase signal 4 during the subinterval SUBI4 are simultaneously outputted, thereby forming data segments of the phase signals 1–4 for use in the next interval IS2.

Further, in the static Gaussian process generator B illustrated in FIG. 2, the output circuit 52B comprises an interpolator circuit which is made up of an interpolation coefficient calculator circuit 522B and an interpolator 524B. The interpolation coefficient calculator circuit 522B receives the difference between a current data segment pX1 and the preceding data segment dX1, and a maximum count value (cntmax=j) indicative of the segment interval length and divides the former by the latter to calculate an interpolation coefficient coeff. The interpolator 524B, which receives the calculated interpolation coefficient coeff and the preceding data segment dX1, further receives a system count value (symcnt=i) indicative of an interpolation cycle number, and adds an increment or a decrement to the preceding data segment dX1 in accordance with the interpolation coefficient coeff for each interpolation cycle, thereby generating an interpolated phase signal, i.e., Gaussian noise data. While the interpolation is omitted in FIG. 4, another known interpolation method may be employed instead of the interpolation method described above.

Next, the circuit configuration and operation of the static Gaussian noise process generator B illustrated in FIG. 2 will be described in greater detail with reference to FIGS. 5 to 11. In particular, FIG. 6 shows detailed operation timings for a variety of circuit components of the static Gaussian noise process generator B. Therefore, the following description will be made with reference also to FIG. 6.

Figure 5:
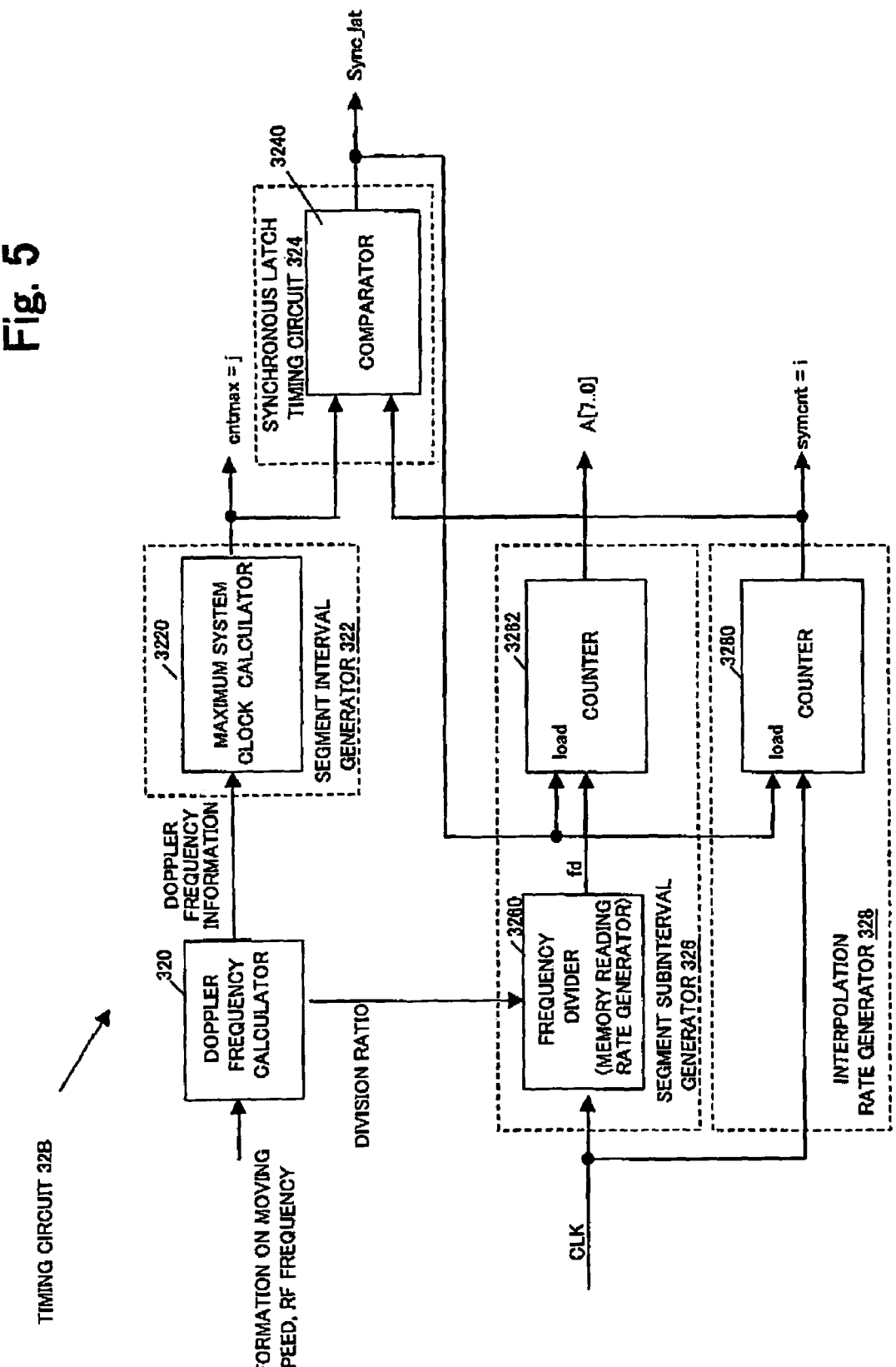
FIG. 5 is a circuit block diagram illustrating in greater detail a timing circuit in FIG. 2 in one embodiment.

FIG. 5 illustrates in detail the circuit configuration of the timing circuit 32B in one embodiment. The timing circuit 32B comprises a Doppler frequency calculator circuit 320, a segment interval generator 322, a synchronous latch timing circuit 324, a segment subinterval generator 326, and an interpolation rate generator 328. More specifically, the Doppler frequency calculator circuit 320 calculates the Doppler frequency in a known manner (as expressed by $Fd=V/\lambda=Fc\cdot V/c$ (Hz)) from such information as a moving speed V (m/s) of a mobile and the RF frequency Fc (Hz) of a radio signal. The segment interval generator 322, which receives the calculated Doppler frequency value, comprises a maximum system clock value calculator circuit 3220 which calculates a maximum of the system clock during a segment interval from the frequency of the system clock and the Doppler frequency, and generates a maximum count value cntmax (=j) indicative of the calculated maximum value (alternatively, in one embodiment of the present invention, the maximum count value cntmax may be simply set to equal to the number of interpolation cycles). The maximum count value cntmax (=j) also determines the length of one segment interval as mentioned above. The Doppler frequency calculator circuit 320 also generates a predetermined division ratio from the frequency of the system clock and the Doppler frequency in order to increase or decrease the length of a particular segment subinterval in accordance with the Doppler frequency.

Next, the synchronous latch timing circuit 324 comprises a comparator 3240 which receives the value cntmax and the value symcnt (=i) (FIG. 6(p)) which is mentioned above and described below in greater detail. The comparator 3240 drives the synchronous latch signal Sync_lat to high when the system count value indicative of the interpolation cycle number is equal to j−1, i.e., when the number of interpolation cycles reaches j indicative of the length of one segment interval (FIG. 6(h)). Next, the subinterval generator 326 comprises a frequency divider 3260 and a counter 3262. The frequency divider 3260 receives the clock CLK (FIG. 6(a)) and the division ratio from the Doppler frequency calculator circuit 320, and generates a clock fd at a frequency associated with the rate at which data is read from the memory 10B in accordance with the Doppler frequency. The counter 3262, which receives the clock fd, also receives the synchronous latch signal Sync_lat at a load terminal, and counts the clock fd after it is reset to zero when the synchronous latch signal Sync_lat goes to high, to generate the path address A[7 . . . 0] (FIG. 6(b)). As mentioned above, the path address defines the periods and numbers of segment subintervals included in each segment interval, and also defines a timing at which each path acquires a selected segment. In FIG. 6(a), the overall period of the path addresses 0–m defines one segment interval, and the period of each path address value defines one segment subinterval. Here, the value m may be at least n−1 or more, and can therefore be a value equal to n−1 or more. Next, the interpolation rate generator 328 comprises a counter 3280 which receives the clock CLX at an input terminal and the synchronous latch signal Sync_latch at a load terminal, counts the clock CLK after it is reset to zero when Sync_lat goes to high, and generates a system count value (=i) (FIG. 6(p)) which is the counted value of the clocks CLK. The system count value also indicates a number given to an interpolation cycle in the interpolation processing executed during each of the segment intervals, as previously mentioned.

Figure 7:
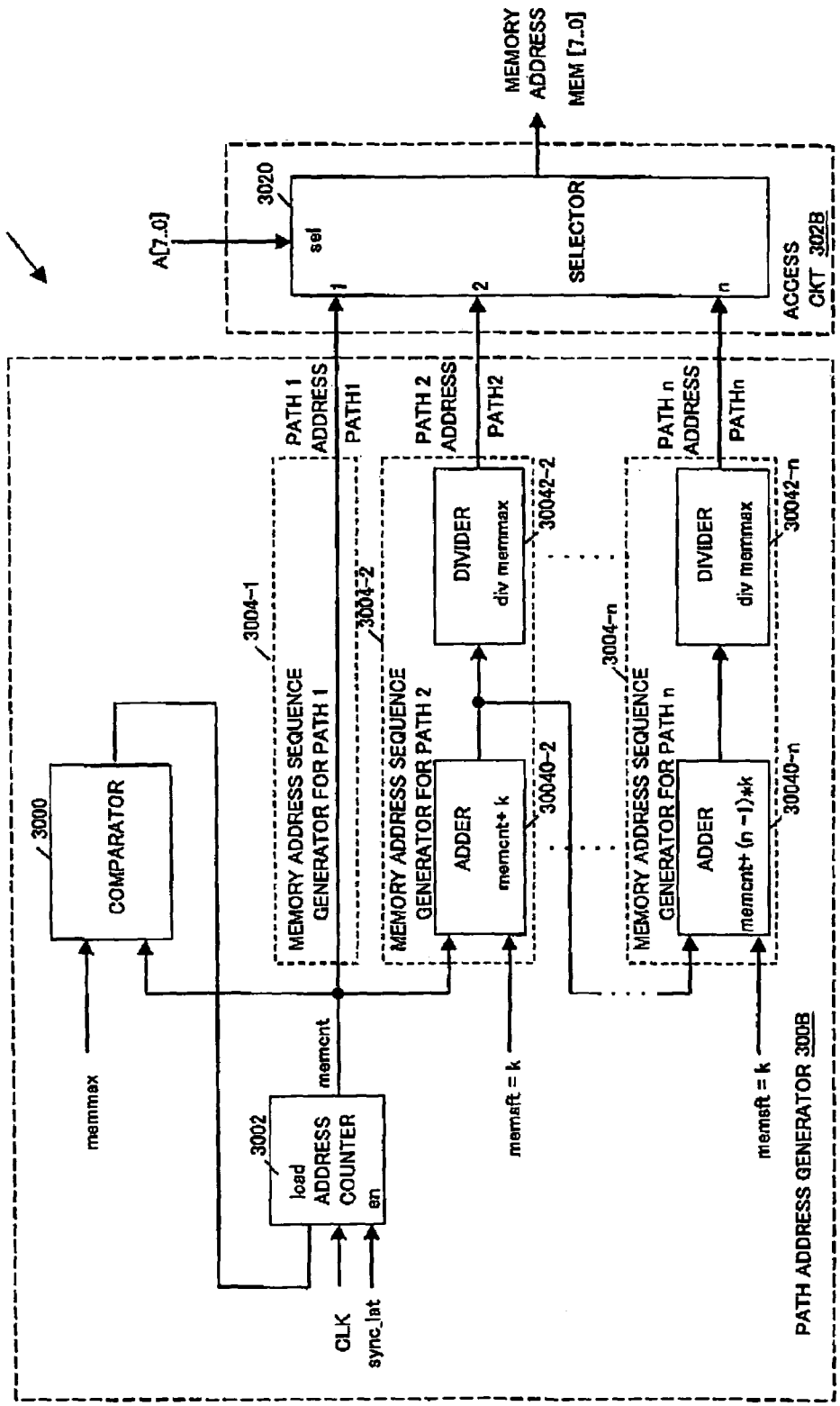
FIG. 7 is a block diagram illustrating in greater detail the circuit configuration of a read-out circuit in FIG. 2.

Referring next to FIG. 7, the circuit configuration of the read-out circuit 30B will be described in greater detail. As illustrated, the read-out circuit 30B generally comprises a path address generator 300B and an access circuit 302B. The path address generator 300B generates a sequence of memory addresses for each path in order to read data segments which are supplied to the a paths 1–n in FIG. 2. The path address generator 300B comprises a comparator 3000, a memory address counter 3002, and memory address sequence generators 3004-1–3004-n associated with the paths 1–n, respectively. More specifically, the comparator 3000 receives the maximum memory address value memmax of the memory 10B at one input terminal and the current memory address count memcnt at the other input terminal, and generates a high output when the memory address count reaches the maximum value. The memory address counter 3002 is connected to receive the high output at a load terminal, the clock at an input, and the synchronous latch signal Sync_lat at an enable input. Thus, the counter 3002 is reset to zero when the memory address count reaches the maximum memory address, and subsequently is enabled to count only when Sync_lat is at high. As a result, the memory address count memcnt starts from zero, is incremented by one every segment interval, again returns to zero when the maximum memory address is reached, and then continuously increments, thereby generating the first address to the last address of the memory 10B in a cyclic manner. The memory address sequence generator 3004-1 for the path 1, which receives the count memcnt, passes the count therethrough as it is, and outputs it as a path-1 address PATH1 [7 . . . 0] (FIG. 6(c)). Specifically, the address sequence generator 3004-1 forms a sequence of memory addresses which increments one by one, in order, from an initial value of zero, so that the path 1 generates a reference phase signal which has the phase of zero degrees (corresponding to the first address location from which the path 1 reads data in FIG. 3).

Next, the memory address sequence generator 3004-2 for the path 2 comprises an adder 30040-2 and a divider 30042-2. The adder 30040-2 receives the count memcnt at one input terminal and a memory address shift value memsft (=k) at the other input terminal, and generates the result of addition (memcnt+k) at its output terminal to form a sequence of memory addresses shifted by k. The subsequent divider 30042-2, which receives the output of the adder 30040-2, divides the received output by the maximum memory address value, and delivers the residue at its output terminal to generate a path-2 address PATH2[7 . . . 0] (FIG. 6(d)), which rolls over to address 0 again when the address from the adder 30040-2 exceeds the maximum memory address value. The remaining memory address sequence generators for the paths 2–n have similar configurations except that the adder shifts the memory addresses by k for each increment of the path number, so that in the path n, memcnt+(n−1)·k is calculated to form a sequence of memory addresses shifted by (n−1)k from the path 1 i.e., path-n addresses PATHn[7 . . . 0] (FIG. 6(e), see also FIG. 3).

The access circuit 302B, which receives the sequence of memory addresses for each path thus formed, comprises a selector 3020 which receives the addresses for the paths 1–n at input terminals 1, 2, . . . n, respectively, and receives a path address signal A at a select input terminal sel. Thus, the selector 3020 selects the addresses for the path 1 when the path address signal A is 0, selects the addresses for the path 2 when the path address signal A is 1, and so on, and finally selects the addresses for the path n when the path address signal A is n−1, and the addresses are output as memory addresses MEM[7 . . . 0] (FIG. 6(f)). In this way, the selector 3020 selects addresses from the next sequence in order within n sequences of memory addresses for each segment subinterval, to read data segments required to form respective phase signals.

Figure 8:
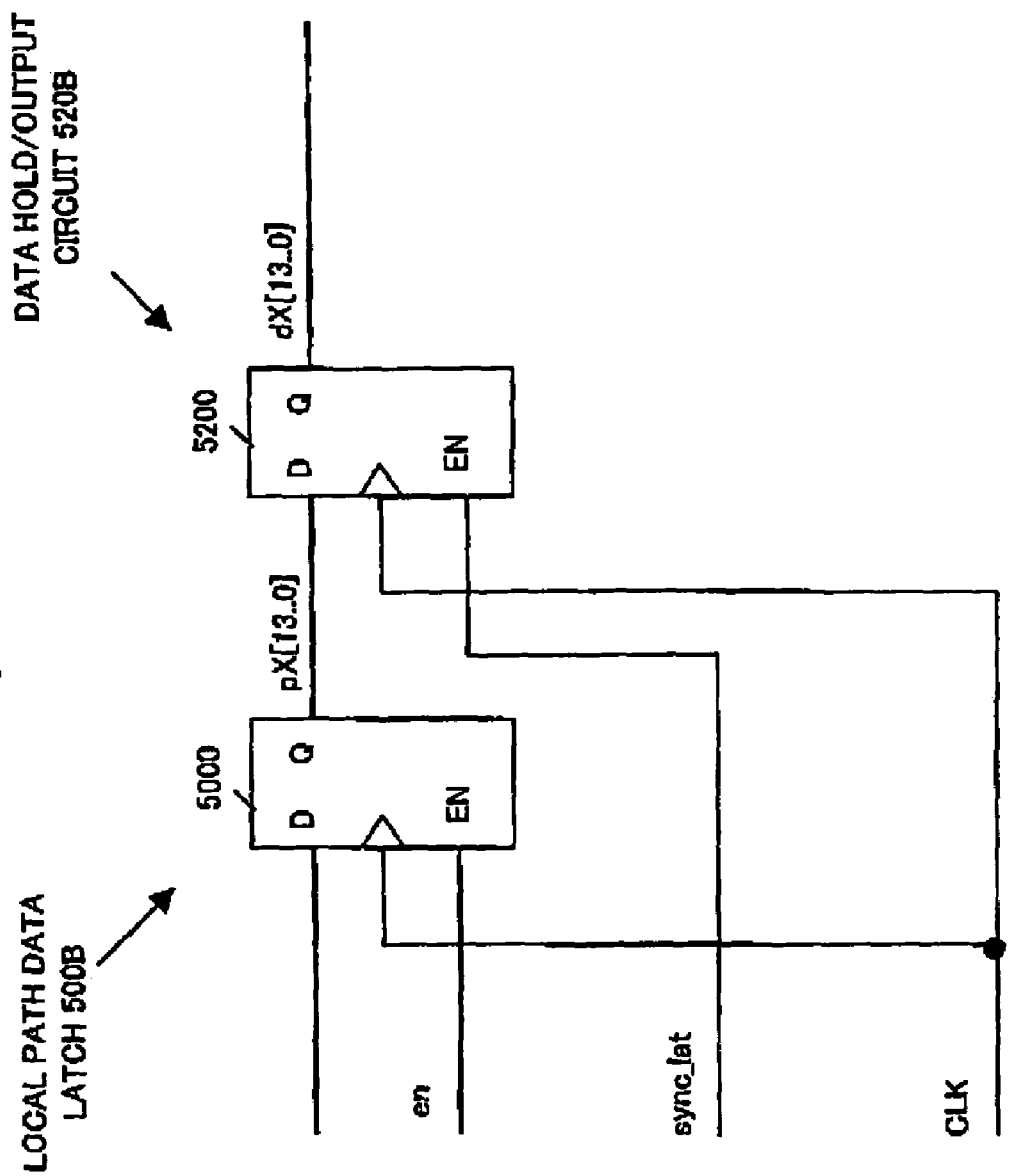
FIG. 8 is a circuit diagram illustrating in detail a local path data latch circuit and a data hold/output circuit in FIG. 2.

Referring next to FIG. 8, the local path data latch circuit 500B and data hold/output circuit 520B will be described in detail. As illustrated, the path data latch circuit 500B comprises a D-type flip-flop (F/F) 5000 which as a clock terminal at which the clock CLK is received, a data (D) terminal connected to the output of the memory 10B, and an enable (EN) terminal connected to receive an enable signal en (which is a signal en1 for the path 1, and a signal en2 for the path 2, and is omitted for the remaining paths). Thus, the F/F 5000 latches memory data D for the path associated therewith as a data segment pX when the enable signal en falls. For example, regarding the path 1, the F/F 5000 latches data D1a for the path associated therewith as a data segment pX1 (see FIG. 6(k)) in response to the enable signal en1, as illustrated in FIG. 6. It should be noted that pX2 is for the path 2. Next, the data hold/output circuit 520B likewise comprises a D-type flip-flop (F/F) 5200 which has a clock terminal at which the clock CLK is received, a data (D) terminal connected to the Q-output of the F/F 5000, and an enable (EN) terminal connected to receive the synchronous latch signal Sync_lat. In this way, the F/P 5200 simultaneously outputs the data segment pX for each of the respective paths 1–n latched during respective segment intervals associated therewith in synchronism with other paths to provide the data segments dX for use during the next segment interval. In FIG. 6, the F/F 5200 latches the data segment pX1 in response to the synchronous latch signal Sync_lat as the data segment dX1 (see FIG. 6(m). It should be noted that dX2 is for the path 2.

Figure 9:
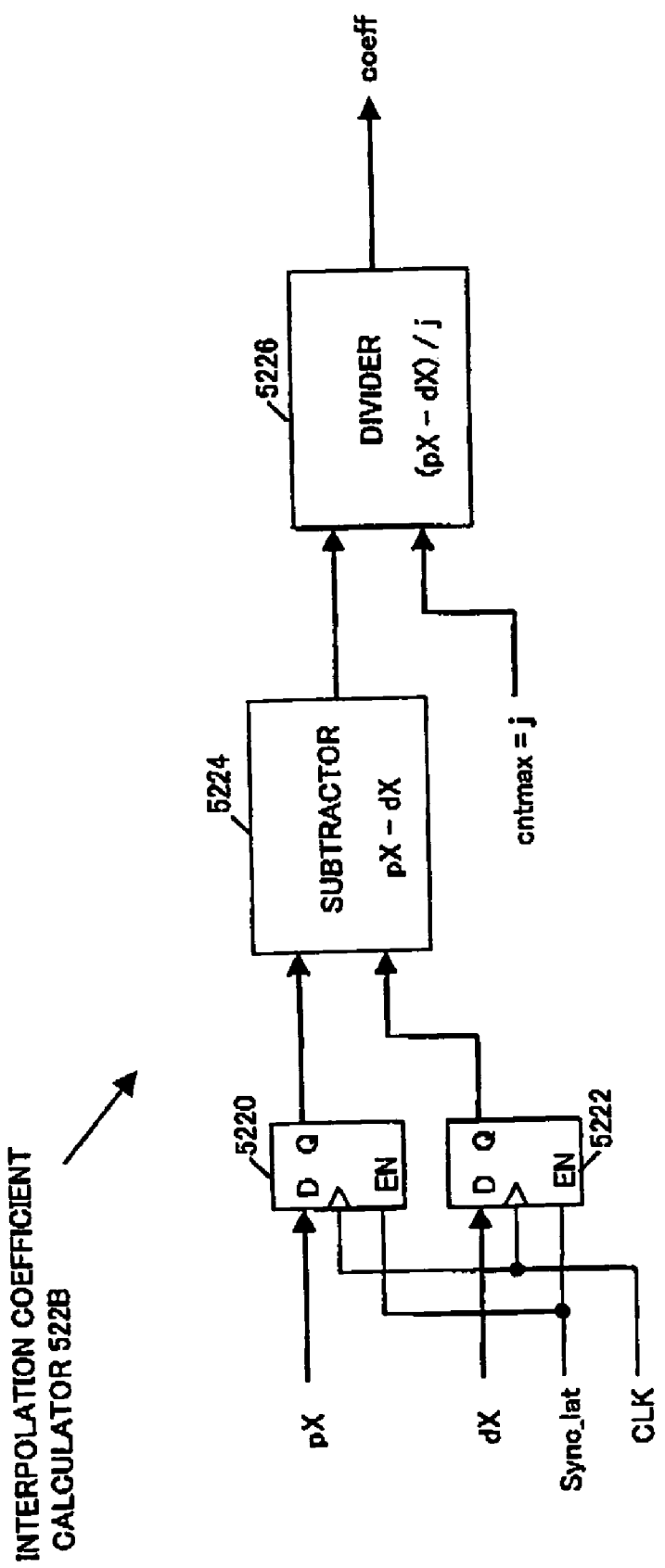
FIG. 9 is a block diagram illustrating in detail an interpolation coefficient calculator in FIG. 2.

Referring next to FIG. 9, the interpolation coefficient calculator circuit 522B will be described in detail. As illustrated, the interpolation coefficient calculator circuit 522B comprises two D-type F/Fs 5220 and 5222, a subtractor 5224, and a divider 5226. The F/F 5220 receives a current data segment pX from the local path data latch circuit 500B at a D-input, the synchronization lath signal Sync_lat at an enable terminal, and the clock CLK at a clock terminal, and latches the current data segment. On the other hand, the F/F 5222 is similar in the circuit configuration, except that it receives the preceding date segment dX and latches it therein. The subtractor 5224, which receives the latched data segments from the respective Q-outputs, calculates the difference between the received data segments (pX−dX). The divider 5226 receives the difference at one input terminal, and a maximum count cntmax (=j) indicative of the number of interpolation cycles in one segment interval at the other input terminal, divides the former by the latter, and outputs the result of the division as an interpolation coefficient coeff (see FIG. 6(o)). In the example illustrated in FIG. 6, a coefficient coeff1 for the path 1 is calculated by subtracting the preceding segment D1o from a current segment D1a, and dividing the difference by j (coeff1=(D1a−D1o)/j). Coefficients for the paths 2 and so on are calculated in a similar manner.

Figure 10:
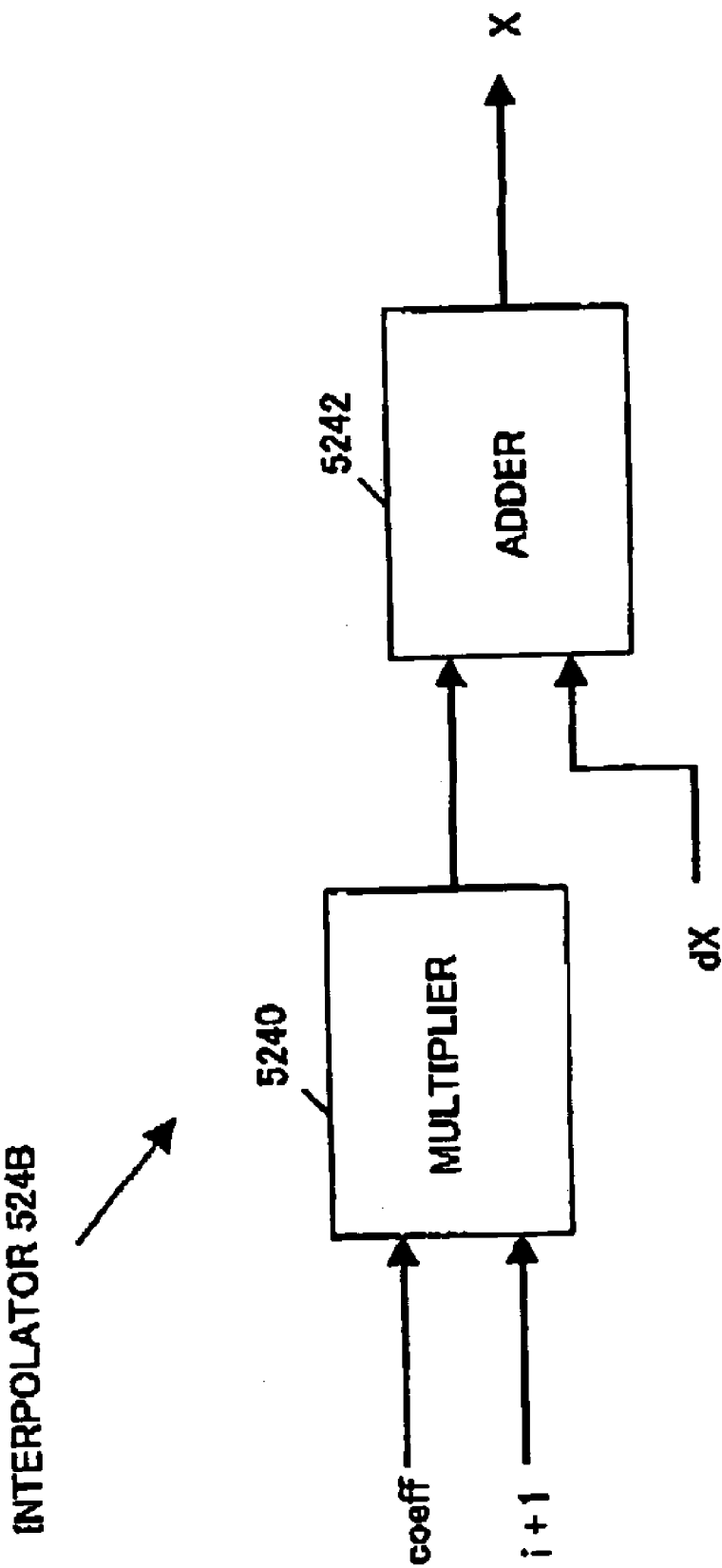
FIG. 10 is a block diagram illustrating in detail the circuit configuration of an interpolator in FIG. 2.

FIG. 10 illustrates the circuit configuration of the subsequent interpolator 524B in detail. As illustrated, the interpolator 524B comprises a multiplier 5240 and an adder 5242. The multiplier 5240 receives the coefficient coeff from the coefficient calculator circuit 522B at one input terminal, and the sum of the system count value symcnt (=i) plus one (no adder is shown), i.e., (i+1) at the other input, multiples the interpolation coefficient coeff by (i+1), and generates the product (=(i+1)·coeff) at its output terminal. The adder 5242 receives the product at one input terminal, and the preceding data segment dX at the other input terminal, and sequentially adds the coefficient value to the preceding data segment value in each interpolation cycle to generate each phase signal, i.e., Gaussian noise data X at its output terminal. In the example illustrated in FIG. 6, the path 1 forms the Gaussian noise data X1[13 . . . 0] after interpolation by sequentially incrementing the preceding data segment dX by the coefficient, such as X1[0]=(dx+coeff) in interpolation cycle 0, X1[0]=(dX+2coeff) in interpolation cycle 1, and so on, to make a transition to the current data segment pX, as illustrated in FIGS. 6(p) and 6(q).

Figure 11:
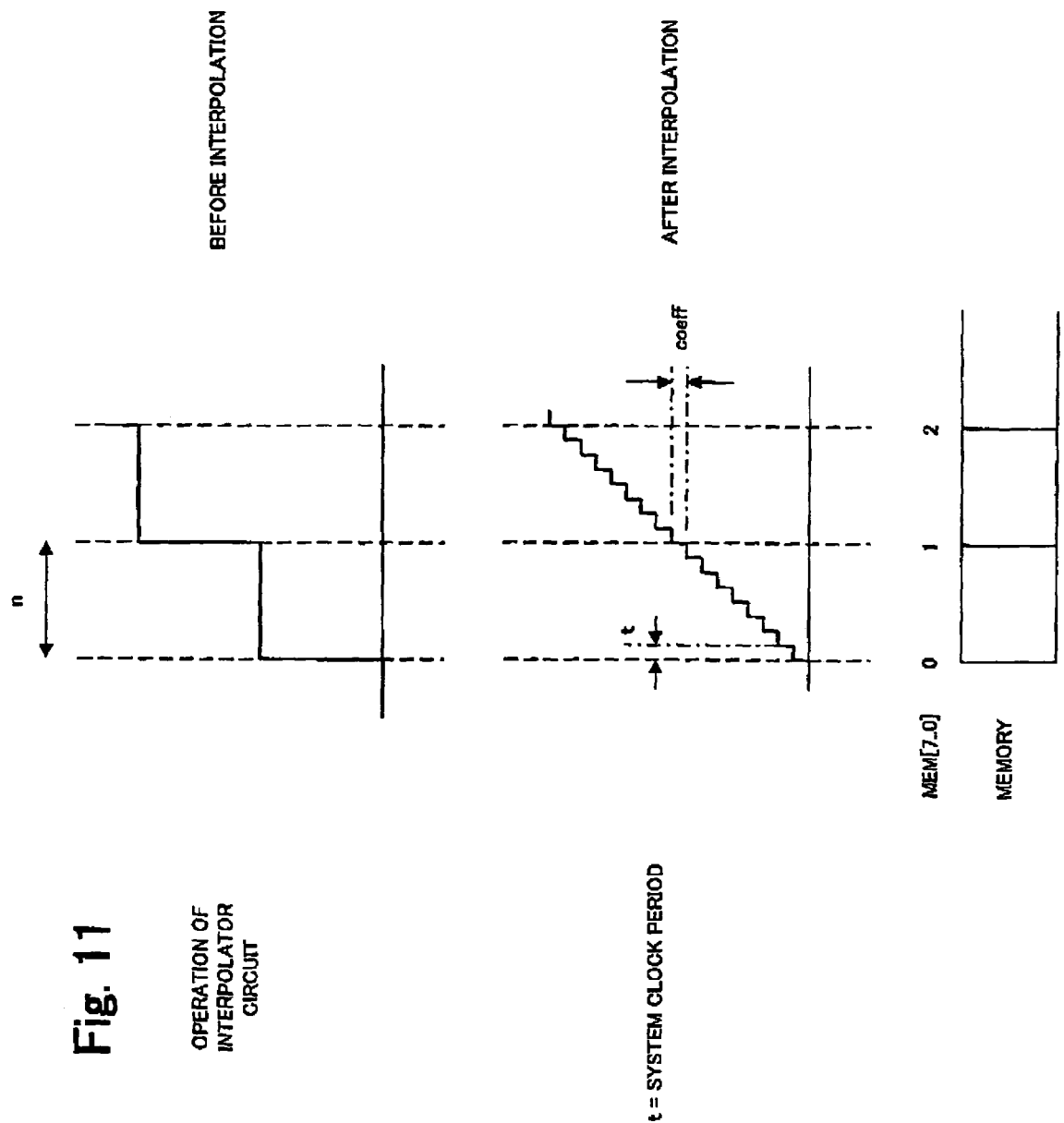
FIG. 11 shows an exemplary operation of the interpolator in FIG. 10.

FIG. 11 represents the foregoing operation of the interpolator 524B by way of example. As illustrated, between adjacent memory addresses, for example, between a preceding data segment of memory address 0 and a current data segment of memory address 1, a smooth transition is accomplished by an interpolation in increments of the coefficient coeff at a system clock period determined by the system count value symcnt.

The static Gaussian process generator B according to the present invention, which is described above in detail, can generate multiple Gaussian noise data X1–Xn having the phases shifted one after another from data of a single signal stored in a memory.

Figure 12:
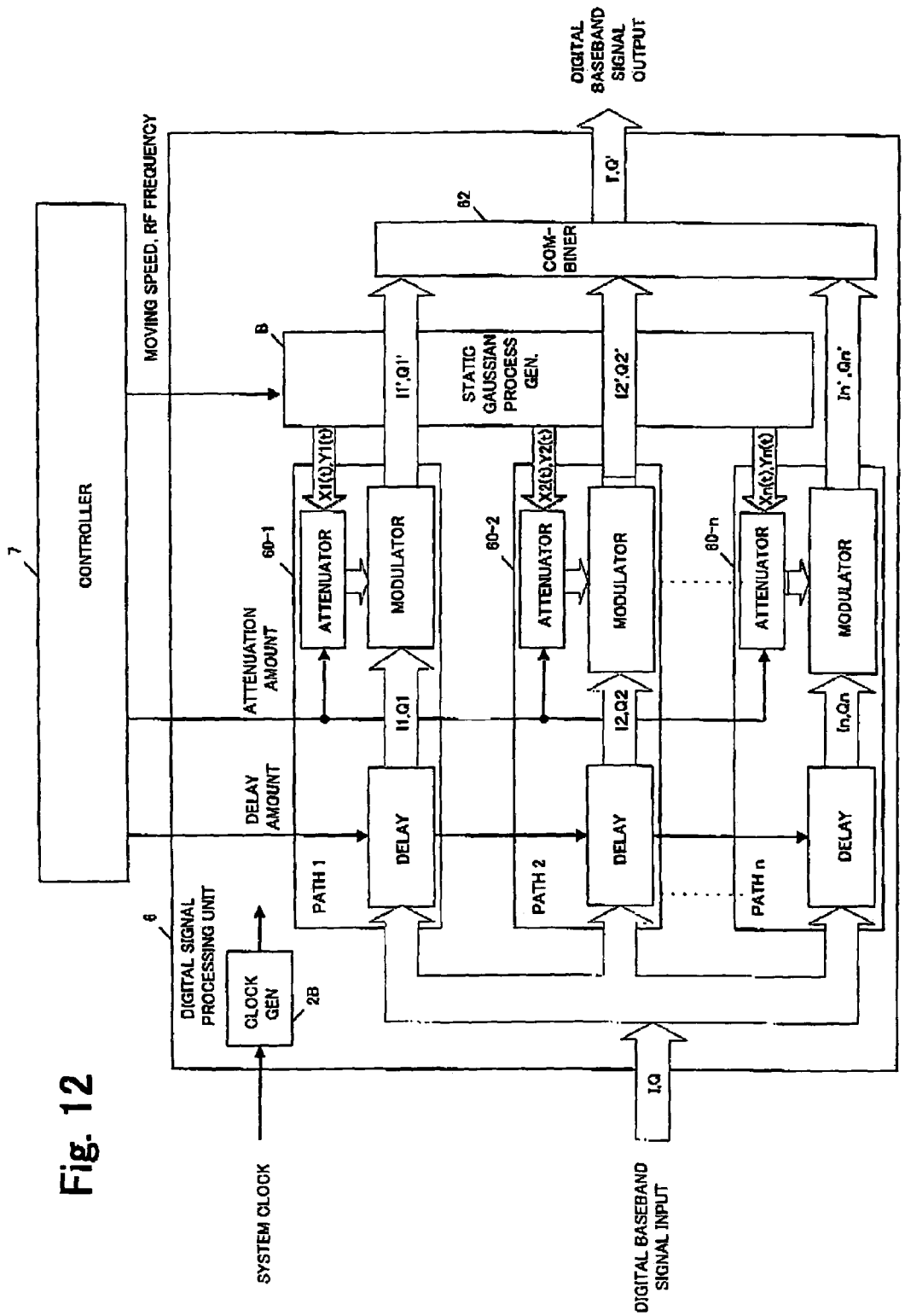
FIG. 12 is a block diagram illustrating an exemplary application of the static Gaussian process generator in FIG. 2 to a multipath fading simulator.

FIG. 12 illustrates a multipath fading simulator which applies the static Gaussian process generator B to a digital signal processing unit 6 for producing a multipath fading effect. The digital signal processing unit 6, which is in a known circuit configuration, receives digital baseband signal inputs (orthogonal components I and Q), and applies a multipath fading effect to the inputs under the control of a controller 7, and generates resulting digital baseband signal outputs (orthogonal components I' and Q'). The principle of the fading simulator is described in Hiraide et al., "Fading Simulator for Land Mobile Radio Communication), Transactions of the Institute of Electronics, information and communication engineers, '75/9, Vo. 58-B, No. 9, pp. 449–456, the disclosure of which is incorporated herein in its entirety. Specifically, the digital signal processing unit 6 comprises n transmission paths (paths) 60-1–60-n for receiving the signal inputs, respectively. While these paths correspond to the paths in FIG. 2, it should be noted that they indicate different parts. The digital signal processing unit 6 also comprises the static Gaussian process generator B illustrated in FIG. 2, and a clock generator 2B corresponding to the clock generator 2 in FIG. 2. The static Gaussian process generator B operates in response to information on a moving speed and an RF frequency from the controller 7. As illustrated, each of the paths comprises a delay, an attenuator, and a modulator, and operates in response to a delay amount and an attenuation amount fed from the controller 7. The attenuators of these paths receive Gaussian noise data $X_1(t)$ and $Y_1(t)$–$X_n(t)$ and $Y_n(t)$, different in phase from one another, respectively, from the static Gaussian process generator B. $X(t)$ and $Y(t)$ represent an in-phase component and an orthogonal component of Gaussian noise data. Thus, each path applies the multipath fading effect to the signal inputs I and Q to generate signals (I1' and Q1') and the like for each path. A combiner 62 receives the signals from the respective paths, and separately adds the respective orthogonal components to form output signals (orthogonal components I' and Q') of the digital signal processing unit 6. In this way, according to the present invention, multi-phase Gaussian noise data for each path of the processing unit 6 can be readily generated from data of a single signal stored in a memory, so that the processing unit 6 can be simplified in circuit configuration.

In the embodiment of the present invention described above in detail, the memory stores one period of signal data, but alternatively, two periods or more of signal data may be stored, and handled as one period. Also, in the foregoing embodiment, the phase difference between a plurality of phase signals is defined by a fixed value or integer k for all the paths, different values may be set between particular paths in some applications. Also, in the foregoing embodiment the present invention is applied to Gaussian noise data but the present invention can be applied to the generation of any signals other than Gaussian noise, as will be apparent to those skilled in the art. The static Gaussian process generator B in the foregoing embodiment can be implemented by entirely or partially employing a digital signal processor (DSP), in which case modifications to the circuit configuration should be apparent to those skilled in the art.

Although only some exemplary embodiments of this invention have been described in detail above, those skilled in the art will readily appreciate that the invention is not limited to the precise construction and compositions disclosed herein and that many modifications are possible in the exemplary embodiments without materially departing from the novel teaching and advantages of this invention. Accordingly, all such modifications are intended to be included within the scope of this invention.

What is claimed is:

1. An apparatus for generating a plurality of phase signals having different phases, said apparatus comprising:
   a memory that stores a plurality of data segments for defining a period of a single signal;
   a selector circuit that, in each of a plurality of segment intervals constituting a phase signal cycle for generating said phase signals, selects from a plurality of data segments defining a period of a single signal stored in said memory a segment for constituting each of said phase signals and delivers the selected segment, wherein:
      each of said segment intervals includes a plurality of segment subintervals corresponding to said plurality of phase signals, respectively, and
      said selector circuit includes:
         a timing circuit that defines said plurality of segment intervals and said plurality of segment subintervals; and
         a reading circuit that reads, for each of said phase signals, said selected segment from said memory during said segment subinterval corresponding to each of said phase signal in each of said segment intervals; and
   a generator circuit that generates each of said phase signals using a plurality of said selected segments for each of said phase signals during said plurality of segment intervals, said generator circuit including:
      an acquisition circuit that acquires and holds each of said selected segments for said plurality of phase signals from said memory; and
      an output circuit that simultaneously outputs from said acquisition circuit each of said selected segments for said plurality of phase signals at the end of each of said segment intervals.

2. The apparatus according to claim 1, wherein said selector circuit selects said selected segment constituting each of said phase signals in each of said segment intervals depending on a phase difference between said plurality of phase signals.

3. The apparatus according to claim 1, wherein each of said phase signals to be generated has a frequency, said apparatus further includes a timing circuit that determines a variable reading rate for reading from said memory, said reading rate being variable depending on the frequency,
   and wherein said reading circuit operates at a variable reading rate.

4. The apparatus according to claim 1, further including a writing circuit that writes said plurality of data segments for defining the period of said single signal into said memory.

5. The apparatus according to claim 1, wherein said reading circuit includes:
   an address generator circuit that defines a plurality of sequences of memory addresses for said plurality of phase signals; and
   an accessing circuit that accesses said memory during said segment subintervals of said plurality of segment interval using said sequence of memory addresses corresponding to each of said phase signals.

6. The apparatus according to claim 5, wherein said address generator circuit includes a plurality of memory address sequence generator circuits corresponding to said plurality of phase signals, respectively, said plurality of sequences of memory addresses being shifted one after another by an amount corresponding to the phase difference between said plurality of phase signals.

7. The apparatus according to claim 1, wherein said generator circuit further includes an interpolator circuit that interpolates said selected segments for each of said phase signals.

8. The apparatus according to claim 7, wherein:
   said interpolator circuit includes interpolation coefficient generator circuit for generating an interpolation coefficient, said interpolation coefficient being determined depending on the difference between adjacent ones of said data segments and the number of said plurality of phase signals.

9. A method of generating a plurality of phase signals having different phases, said method comprising the steps of:
   in each of a plurality of segment intervals constituting a phase signal cycle for generating said phase signals, selecting from a plurality of data segments defining a period of a single signal stored in a memory, a segment for constituting each of said phase signals and delivering the selected segment, wherein:
      each of said segment intervals includes a plurality of segment subintervals corresponding to said plurality of phase signals, respectively, and
      selecting a segment includes, for each of said phase signals, reading said selected segment from said memory during said segment subinterval corresponding to each of said phase signals in each of said segment intervals; and generating each of said phase signals using a plurality of said selected segments for each of said phase signals during said plurality of segment intervals by acquiring and holding each of said selected segments for said plurality of phase signals from said memory, and simultaneously outputting each of said selected segments for said plurality of phase signals at the end of each of said segment intervals.

10. The method according to claim 9, wherein said selected segment constituting each of said phase signal in each of said segment intervals is selected depending on a phase difference between said plurality of phase signals.

11. The method according to claim 9, further including the step of:
storing said plurality of data segments in said memory, said data segments defining the period of said single signal.

12. The method according to claim 9, wherein said plurality of phase signals comprise a multi-phase Gaussian noise signal.

13. The method according to claim 12, wherein said multi-phase Gaussian noise signal is used for applying a multipath fading effect.

14. The method according to claim 9, wherein said step of reading said selected segments includes;
defining a plurality of sequences of memory addresses for said plurality of phase signals; and
accessing said memory during said segment subintervals of said plurality of segment intervals using said sequence of memory addresses corresponding to each of said phase signals.

15. The method according to claim 14, wherein said plurality of sequences of memory addresses are shifted one after another by a an amount corresponding to the phase difference between said plurality of phase signals.

16. The method according to claim 9, wherein said step of generating each of said phase signals further includes the step of interpolating said selected segments for each of said phase signals.

17. The method according to claim 16, wherein said interpolation uses an interpolation coefficient, and said interpolation coefficient is determined depending on the difference between adjacent ones of said data segments and the number of said plurality of phase signals.

18. The method according to claim 16, wherein; each of said segment intervals is shorter than one cycle of each of said phase signals, and
said interpolation is performed at a shorter interpolation cycle than said segment interval.

19. The method according to claim 9, wherein each of said phase signals to be generated has a frequency, and wherein said selected segments are read from said memory at a reading rate which varies depending on the frequency.

20. The method according to claim 19, wherein the frequency of said phase signals varies in accordance with the Doppler frequency.

21. An apparatus for generating a plurality of phase signals having different phases, said apparatus comprising:
means for storing a plurality of data segments for defining a period of a single signal;
means for selecting, in each of a plurality of segment intervals constituting a phase signal cycle for generating said phase signals, from a plurality of data segments defining a said period of said single signal stored in said memory a segment for constituting each of said phase signals and delivering the selected segment, wherein:
each of said segment intervals includes a plurality of segment subintervals corresponding to said plurality of phase signals, respectively, and
said means for selecting includes:
means for defining each of said segment intervals and said plurality of segment subintervals; and
means for reading, for each of said phase signals, said selected segment from said memory during said segment subinterval corresponding to each of said phase signal in each of said segment intervals; and
means for generating each of said phase signals using a plurality of said selected segments for each of said phase signals during said plurality of segment intervals, said means for generating each of said phase signals including:
means for acquiring and holding each of said selected segments for said plurality of phase signals from said memory; and
means for simultaneously outputting from said means for acquiring and holding each of said selected segments for said plurality of phase signals at the end of said segment intervals.

* * * * *